(12) United States Patent
Usui

(10) Patent No.: US 7,676,417 B2
(45) Date of Patent: *Mar. 9, 2010

(54) METHOD AND SYSTEM FOR UNIFIED MANAGEMENT OF PLURALITY OF ASSETS USING COMPUTER NETWORK

(76) Inventor: Masaaki Usui, Cosmo Matsudo Royal Form 1103, 45-3, Nemoto, Matsudo-shi, Chiba 271-0077 (JP)

( * ) Notice: Subject to any disclaimer, the term of this patent is extended or adjusted under 35 U.S.C. 154(b) by 879 days.

This patent is subject to a terminal disclaimer.

(21) Appl. No.: 11/418,236

(22) Filed: May 5, 2006

(65) Prior Publication Data

US 2006/0206400 A1 Sep. 14, 2006

Related U.S. Application Data

(63) Continuation of application No. 09/679,294, filed on Oct. 6, 2000, now Pat. No. 7,069,241.

(30) Foreign Application Priority Data

May 24, 2000 (JP) ............................. 2000-152602

(51) Int. Cl.
*G06Q 40/00* (2006.01)
(52) U.S. Cl. ..................... 705/36 R; 705/35; 705/37; 707/100
(58) Field of Classification Search ............ 705/35–37
See application file for complete search history.

(56) References Cited

U.S. PATENT DOCUMENTS 5,845,267 A * 12/1998 Ronen ......................... 705/40
5,893,079 A * 4/1999 Cwenar ..................... 705/36 R
5,913,202 A * 6/1999 Motoyama ................. 706/36 R (Continued)

FOREIGN PATENT DOCUMENTS

EP 1361533 A1 12/2003

(Continued)

OTHER PUBLICATIONS

Online Portfolio Management Tool Debuts on Intuit's Quicken.com, Apr. 27, 1999, PR Newswire. New York: p. 1.*

(Continued)

*Primary Examiner*—Stefanos Karmis
(74) *Attorney, Agent, or Firm*—Oliff & Berridge, PLC

(57) ABSTRACT

A method and system for collectively displaying in real-time on the Internet the status of personal assets and transactions. The system comprises a plurality of asset databases corresponding to a plurality of financial institutions; storing portfolio information related to total assets in the above-mentioned plurality of financial institutions; a unified asset management server for receiving asset information from the above-mentioned plurality of financial institutions and storing same respectively in the above-mentioned plurality of asset databases, and preparing the above-mentioned portfolio based on the above-mentioned plurality of asset databases and storing the same; an asset management database for managing a user's assets; and a financial institution server connected to the above-mentioned authentication database, the above-mentioned asset management database, and the above-mentioned transaction management database. The unified asset management server prepares a portfolio of all assets.

2 Claims, 8 Drawing Sheets

U.S. PATENT DOCUMENTS

| | | | |
|---|---|---|---|
| 5,920,848 A * | 7/1999 | Schutzer et al. | 705/42 |
| 6,233,565 B1 * | 5/2001 | Lewis et al. | 705/35 |
| 6,347,307 B1 * | 2/2002 | Sandhu et al. | 705/36 R |
| 6,349,290 B1 * | 2/2002 | Horowitz et al. | 705/35 |
| 6,601,044 B1 * | 7/2003 | Wallman | 705/36 R |
| 6,647,410 B1 * | 11/2003 | Scimone et al. | 709/206 |
| 6,839,686 B1 * | 1/2005 | Galant | 705/36 R |
| 6,876,981 B1 * | 4/2005 | Berckmans | 705/35 |
| 7,062,458 B2 * | 6/2006 | Maggioncalda et al. | 705/36 R |
| 7,069,241 B1 * | 6/2006 | Usui | 705/36 R |
| 7,165,044 B1 * | 1/2007 | Chaffee | 705/37 |
| 2006/0206400 A1 * | 9/2006 | Usui | 705/35 |

FOREIGN PATENT DOCUMENTS

| | | |
|---|---|---|
| JP | A-6-295307 | 10/1994 |
| JP | A-6-348743 | 12/1994 |
| JP | A-8-185441 | 7/1996 |
| JP | A-10-222581 | 8/1998 |
| WO | WO 99/66380 | 12/1999 |

OTHER PUBLICATIONS

"Shikin Shuchu Shisutemu <Supa Kontororu> Sosasetumeisho Sanpan," (Centralized Funds System <Super Control> Manual 3$^{rd}$ Edition, Kabushiki Kaisha Fuji Soken Mediacreate, Jul. 31, 1996, pp. 19, 78-85.

"Hitome de wakaru Microsoft Money 2000 Shohan" (Microsoft Money At a Glance, 1$^{st}$ Edition), Stephen Nelson, Nikkei BP Soft Press, Dec. 6, 1999, pp. 63-65.

English-language translation of Japanese Office Action drafted on Sep. 4, 2009.

* cited by examiner

FIG. 3

| | TOTAL | SAVINGS/DEPOSITS | STOCKS | BONDS | INVESTMENTS/TRUSTS | FINANCIAL PRODUCTS | OTHERS |

| DESCRIPTION | TOTAL AMOUNT | PROFIT/LOSS | COMPARED TO PREVIOUS DAY | RATIO |
|---|---|---|---|---|
| SAVINGS/DEPOSITS | | | | |
| STOCKS | | | | |
| BONDS | | | | |
| INVESTMENTS/TRUSTS | | | | |
| FINANCIAL PRODUCTS | | | | |
| OTHERS | | | | |
| TOTAL | | | | |

FIG. 4

| TOTAL | SAVINGS/DEPOSITS | STOCKS | BONDS | INVESTMENTS/TRUSTS | FINANCIAL PRODUCTS | OTHERS |

A. SPOT GOODS

PRICE UNIT: YEN

| COMPANY | ISSUE | QUANTITY | ACQUISITION PRICE | MARKET VALUE | TOTAL MARKET VALUE AMOUNT | GAIN/LOSS | CHANGE FROM PRECEDING DAY |
|---|---|---|---|---|---|---|---|
| SECURITIES COMPANY A | INDUSTRY A | 1,000 | 500 | 700 | 700,000 | +200,000 | +50 |
|  | INDUSTRY B | 1,000 | 400 | 600 | 600,000 | +200,000 | +50 |
| SECURITIES COMPANY B | INDUSTRY C | 1,000 | 300 | 500 | 500,000 | +200,000 | +50 |
| TOTAL |  |  |  |  | 1,800,000 | +600,000 | ... |

B. MARGIN TRANSACTIONS (BUYING)

PRICE UNIT: YEN

| COMPANY | ISSUE | QUANTITY | ACQUISITION PRICE | MARKET VALUE | TOTAL MARKET VALUE AMOUNT | GAIN/LOSS | CHANGE FROM PRECEDING DAY | DAILY YIELD |
|---|---|---|---|---|---|---|---|---|
| SECURITIES COMPANY A | INDUSTRY D | 1,000 | 500 | 700 | 700,000 | +200,000 | +50 | 0.01 |

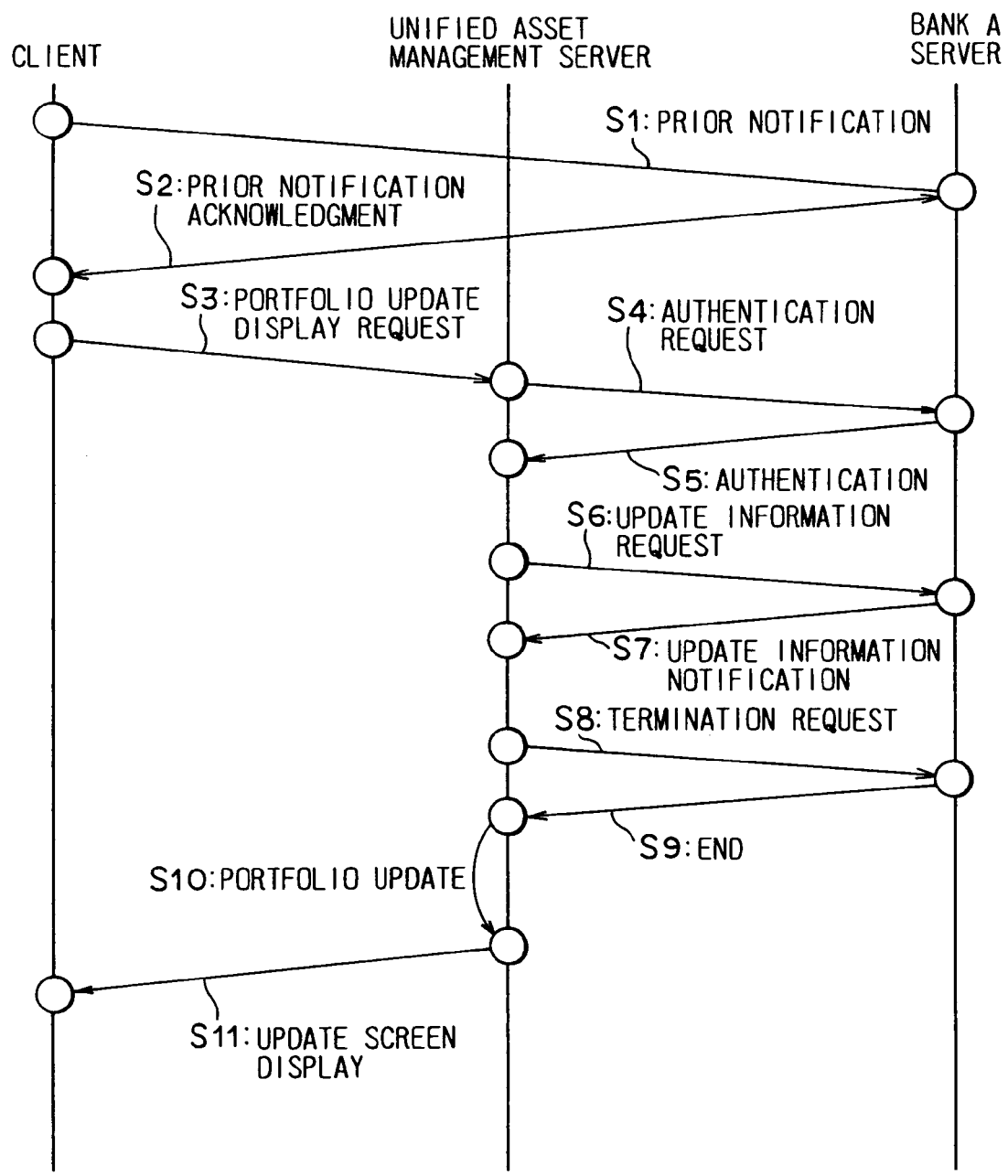

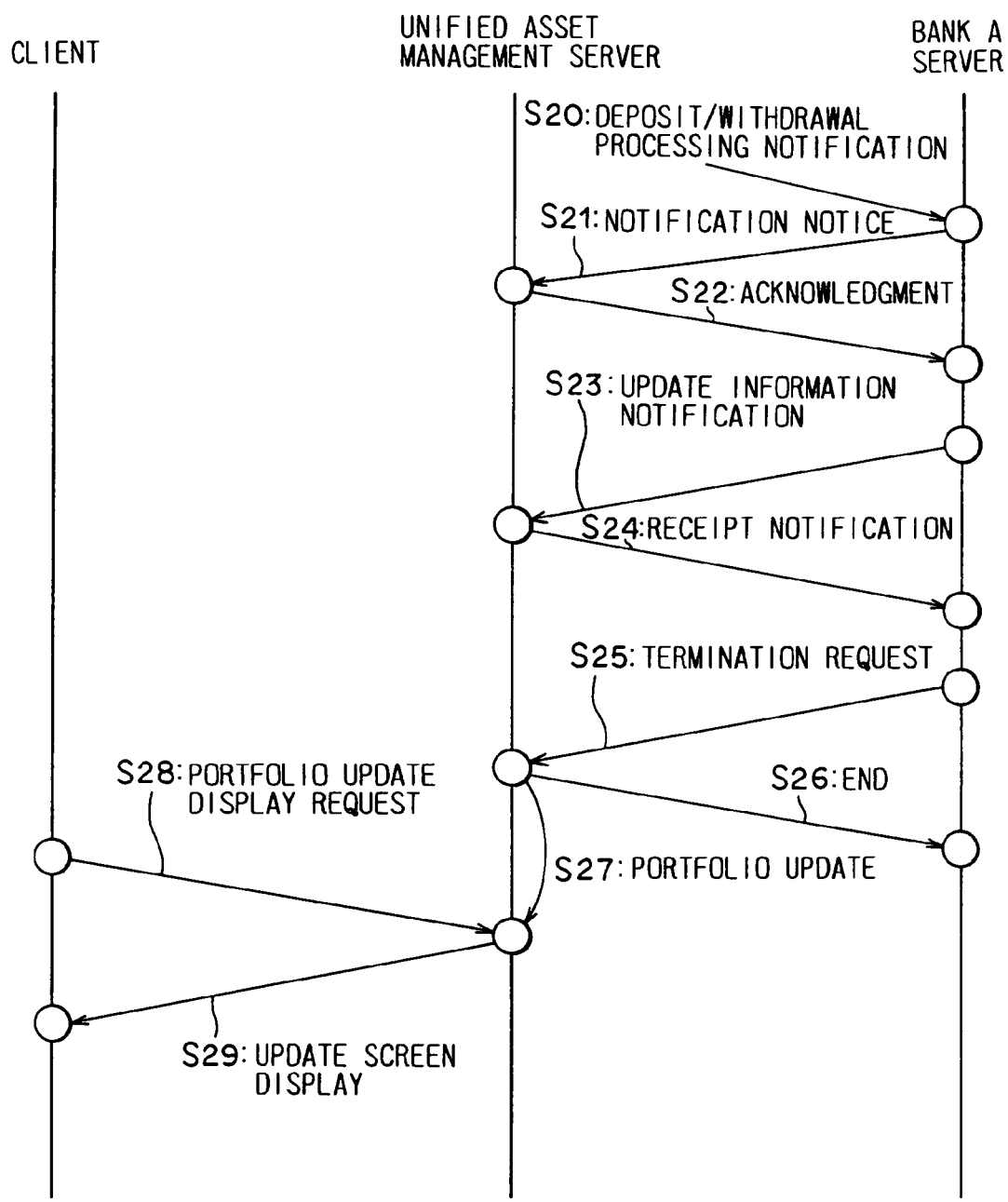

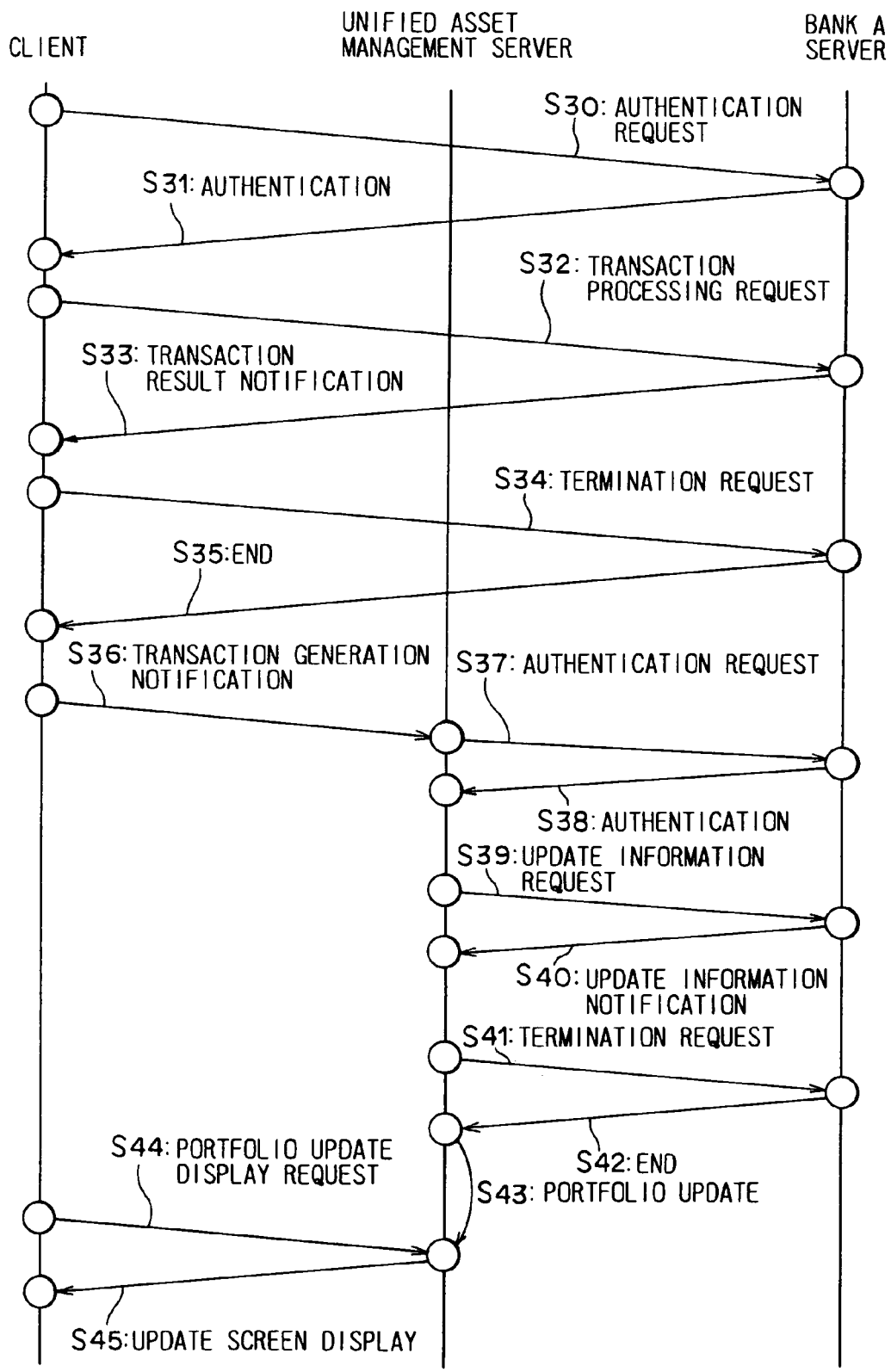

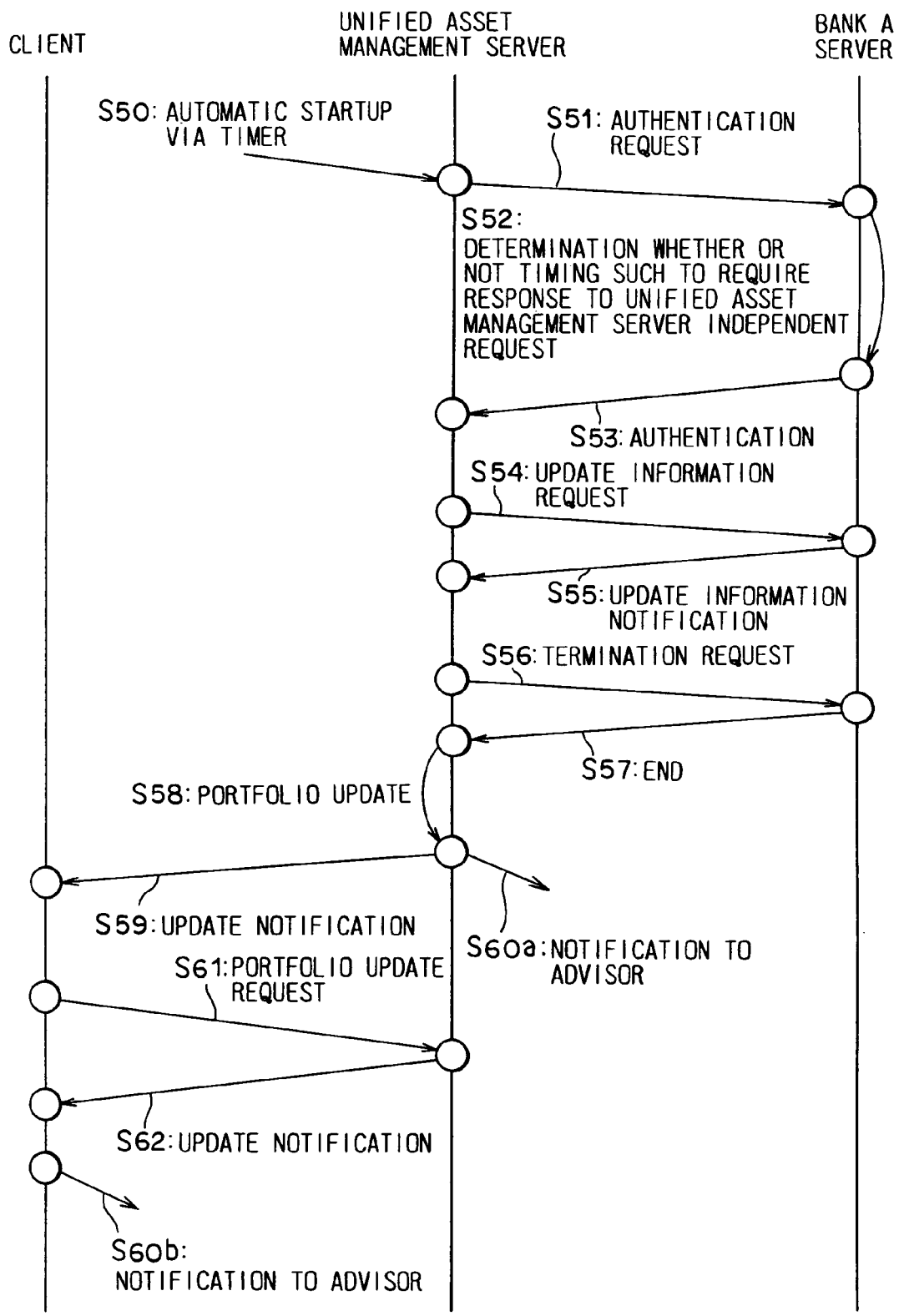

METHOD AND SYSTEM FOR UNIFIED MANAGEMENT OF PLURALITY OF ASSETS USING COMPUTER NETWORK

CROSS-REFERENCE TO RELATED APPLICATION

This application is a continuation of U.S. patent application Ser. No. 09/679,294, filed Oct. 6, 2000, which is hereby incorporated by reference in its entirety.

BACKGROUND

The present invention relates to a method and system for the unified management of a plurality of assets using a computer network, which enables a user, who has accounts at a plurality of financial institutions, to automatically and in real-time obtain without any trouble a portfolio comprising a plurality of assets.

Services, by which funds are deposited, or stocks and bonds are bought and sold via an Internet home page, are being provided as electronic commerce. Furthermore, it is also possible to obtain balance information on one's own account. In services such as these, although a user is able to separately peruse on the Internet the status of asset information or transactions of his account with a company, which provides such service, he is not able to simultaneously obtain the status of asset information and transactions of a plurality of companies.

In the utilization and management of assets, there is used a table, which is called a portfolio, and by which all asset information is managed by perusal. In the past, a portfolio was prepared using off-the-shelf asset management software. A portfolio is also effective when using electronic commerce, and it is desirable that this portfolio be capable of being prepared and updated easily and in real-time. However, when using off-the-shelf asset management software, it is not possible for a user to grasp the current overall state of asset information unless he inputs each account transaction himself each time.

SUMMARY OF THE INVENTION

An object of the present invention is to solve for such problems by providing a service, which collectively peruses assets at a plurality of different companies, and automatically prepares a portfolio based on the results thereof.

According to a method and system for the unified management of a plurality of assets using a computer network related to the present invention, a user's comprehensive asset management is made easier by providing a service, which collectively displays in real-time on the Internet the status of personal assets and transactions.

A method for the unified management of a plurality of assets using a computer network related to the present invention comprises the steps of a client computer notifying a financial institution server to send asset information to a unified asset management server; the above-mentioned client computer requesting the above-mentioned unified asset management server to update a portfolio; the above-mentioned unified asset management server requesting the above-mentioned financial institution server for authentication; the above-mentioned financial institution server providing authentication when the above-mentioned unified asset management server is the server specified in the notification from the above-mentioned client computer; the above-mentioned unified asset management server requesting the above-mentioned financial institution server to send the above-mentioned asset information; the above-mentioned financial institution server sending the above-mentioned asset information to the above-mentioned unified asset management server; the above-mentioned unified asset management server updating a portfolio based on the above-mentioned asset information received; and the above-mentioned unified asset management server sending the updated portfolio to the above-mentioned client computer.

A method for the unified management of a plurality of assets using a computer network related to the present invention comprises the steps of a financial institution server being notified to the effect that an event comprising a deposit/withdrawal process has taken place; the above-mentioned financial institution server notifying a unified asset management server to the effect that asset information will be sent; the above-mentioned financial institution server sending the above-mentioned asset information to the above-mentioned unified asset management server; the above-mentioned unified asset management server updating a portfolio based on the above-mentioned asset information received; and the above-mentioned unified asset management server sending the updated portfolio to the above-mentioned client computer.

A method for the unified management of a plurality of assets using a computer network related to the present, invention comprises the steps of a client computer requesting a financial institution server for authentication; the above-mentioned financial institution server providing authentication; the above-mentioned client computer requesting the above-mentioned financial institution server to execute a prescribed transaction; the above-mentioned financial institution server notifying the above-mentioned client computer of the results of the execution of the above-mentioned transaction; the above-mentioned client computer requesting the above-mentioned unified asset management server to update a portfolio; the above-mentioned unified asset management server requesting the above-mentioned financial institution server for authentication; the above-mentioned financial institution server providing authentication when the request for the above-mentioned authentication by the above-mentioned unified asset managements server is made within a prescribed time from the execution of a the above-mentioned transaction; the above-mentioned unified asset management server requesting the above-mentioned financial institution server to send the above-mentioned asset information; the above-mentioned financial institution server sending the above-mentioned asset information to the above-mentioned unified asset management server; the above-mentioned unified asset management server updating a portfolio based on the above-mentioned asset information received; and the above-mentioned unified asset management server sending the updated portfolio to the above-mentioned client computer.

A method for the unified management of a plurality of assets using a computer network related to the present invention comprises the steps of a unified asset management server being started up automatically by a timer; the above-mentioned unified asset management server requesting the above-mentioned financial institution server for authentication; the above-mentioned financial institution server providing authentication when the request for the above-mentioned authentication by the above-mentioned unified asset management server was made within a predetermined time period; the above-mentioned unified asset management server requesting the above-mentioned financial institution server to send the above-mentioned asset information; the above-mentioned financial institution server sending the above-mentioned asset information to the above-mentioned unified asset management server; the above-mentioned unified asset management server updating a portfolio based on the above-mentioned asset information received; and the above-mentioned unified asset management server sending the updated portfolio to the above-mentioned client computer.

Preferably, the method for the unified management of a plurality of assets using a computer network related to the present invention also comprises the step of ending the above-mentioned updated portfolio to an adviser server in order to receive advice.

A unified asset management system related to the present invention comprises a plurality of assets databases corresponding to a plurality of financial institutions; a plurality of authentication information databases corresponding to the above-mentioned plurality of financial institutions; a portfolio database for storing portfolio information related to total assets in the above-mentioned plurality of financial institutions; a unified asset management server for receiving asset information from the above-mentioned plurality of financial institutions and storing same respectively in the above-mentioned plurality of asset databases, and, in addition, for preparing the above-mentioned portfolio based on the above-mentioned plurality of asset databases and storing same in the above-mentioned portfolio database; an authentication database for performing user authentication; an asset management database for managing a user's assets; a transaction management database for storing transaction information related to a user's assets; an event notification unit, which, when a transaction occurs, notifies the above-mentioned unified asset management server to that effect; and a financial institution server connected to to the above-mentioned authentication database, the above-mentioned asset management database, and the above-mentioned transaction management database, and the above-mentioned financial institution server sends asset information to the above-mentioned unified asset management server after the notification of the above-mentioned event notification unit.

A unified asset management system related to the present invention comprises a plurality at assets databases corresponding to a plurality of financial institutions; a plurality of authentication information databases corresponding to the above-mentioned plurality of financial institutions; a portfolio database for storing portfolio information related to total assets in the above-mentioned plurality of financial institutions; a clock/calendar apparatus; a unified asset management server for receiving asset information from the above-mentioned plurality of financial institutions and storing, same respectively in the above-mentioned plurality of asset databases and, in addition, for preparing the above-mentioned portfolio based on the above-mentioned plurality of asset databases and storing same in the above-mentioned portfolio database; an authentication database for performing user authentication; an asset management database for managing a user's assets; a transaction management database for storing transaction information related to a user's assets; a second clock/calendar apparatus; and a financial institution server connected to to the above-mentioned authentication database, the above-mentioned asset management database, and the above-mentioned transaction management database, and the above-mentioned unified asset management server receives a signal from the above-mentioned clock/calendar apparatus, and requests the above-mentioned financial institution server to send asset information, and the above-mentioned financial institution server receives a signal from the above-mentioned second clock/calendar apparatus and based on this signal makes a determination as to whether or not the request from the above-mentioned unified asset management server was made in a predetermined period of time, and, in addition, sends the above-mentioned asset information on the basis of the results of this determination.

Storage media related to the present invention store programs for achieving the above-mentioned methods/systems.

The media comprise, for example, floppy disks, hard disks, magnetic tape, magneto-optical discs, CD-ROM, DVD, ROM cartridges, RAM memory cartridges equipped with battery backup, flash memory cartridges, and nonvolatile RAN cartridges and the like.

Further, the present invention comprises telecommunications media, such as telephone lines and other wired telecommunications media, and microwave circuits and other wireless telecommunications media. The Internet is also included in the telecommunications media referred to here.

A medium is something on which information (mainly digital data, programs) is stored by some physical means or another, and something, which enables a prescribed function to be performed by a computer, dedicated processor, or other processing device. In other words, a medium can be anything that downloads a program to a computer by some means or another, and causes the execution of a prescribed function.

BRIEF DESCRIPTION OF THE DRAWINGS

FIG. 3 is an example of a portfolio screen of an aspect of the embodiment of the present invention;

FIG. 4 is an example of a portfolio screen of an aspect of the embodiment of the present invention;

FIG. 5 is a diagram showing a processing procedure in an aspect of the embodiment of the present invention;

FIG. 6 is a diagram showing another processing procedure in an aspect of the embodiment of the present invention;

FIG. 7 is a diagram showing another processing procedure in an aspect of the embodiment of the present invention; and FIG. 8 is a diagram showing another processing procedure in an aspect of the embodiment of the present invention.

DESCRIPTION OF THE PREFERRED EMBODIMENTS

The aspects of the embodiment of the present invention will be explained utilizing the figures.

Figure 1:
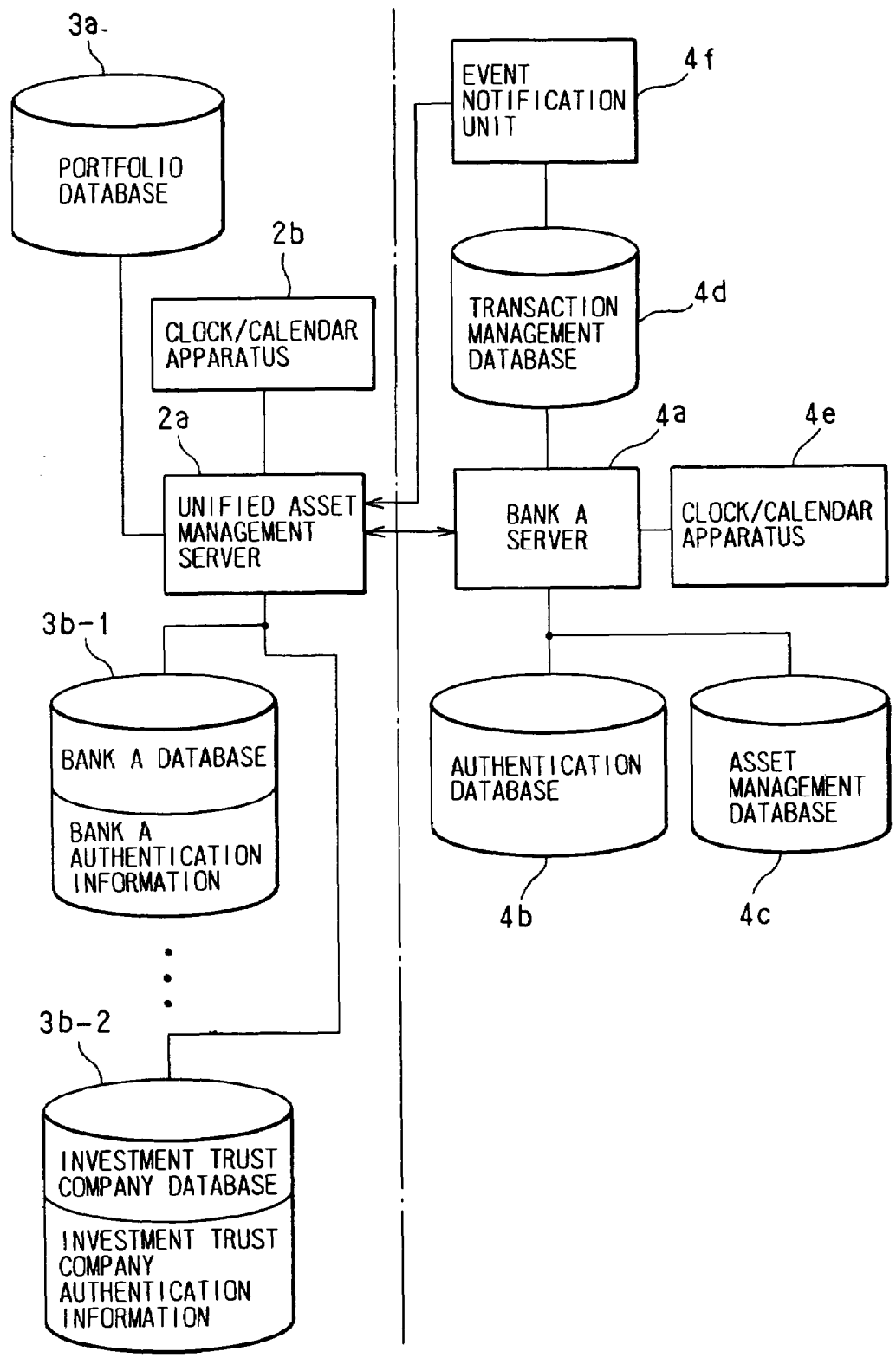
FIG. 1 is a diagram showing the simplified constitutions of a unified asset management server and financial institution server related to an aspect of the embodiment of the present invention.
Figure 2:
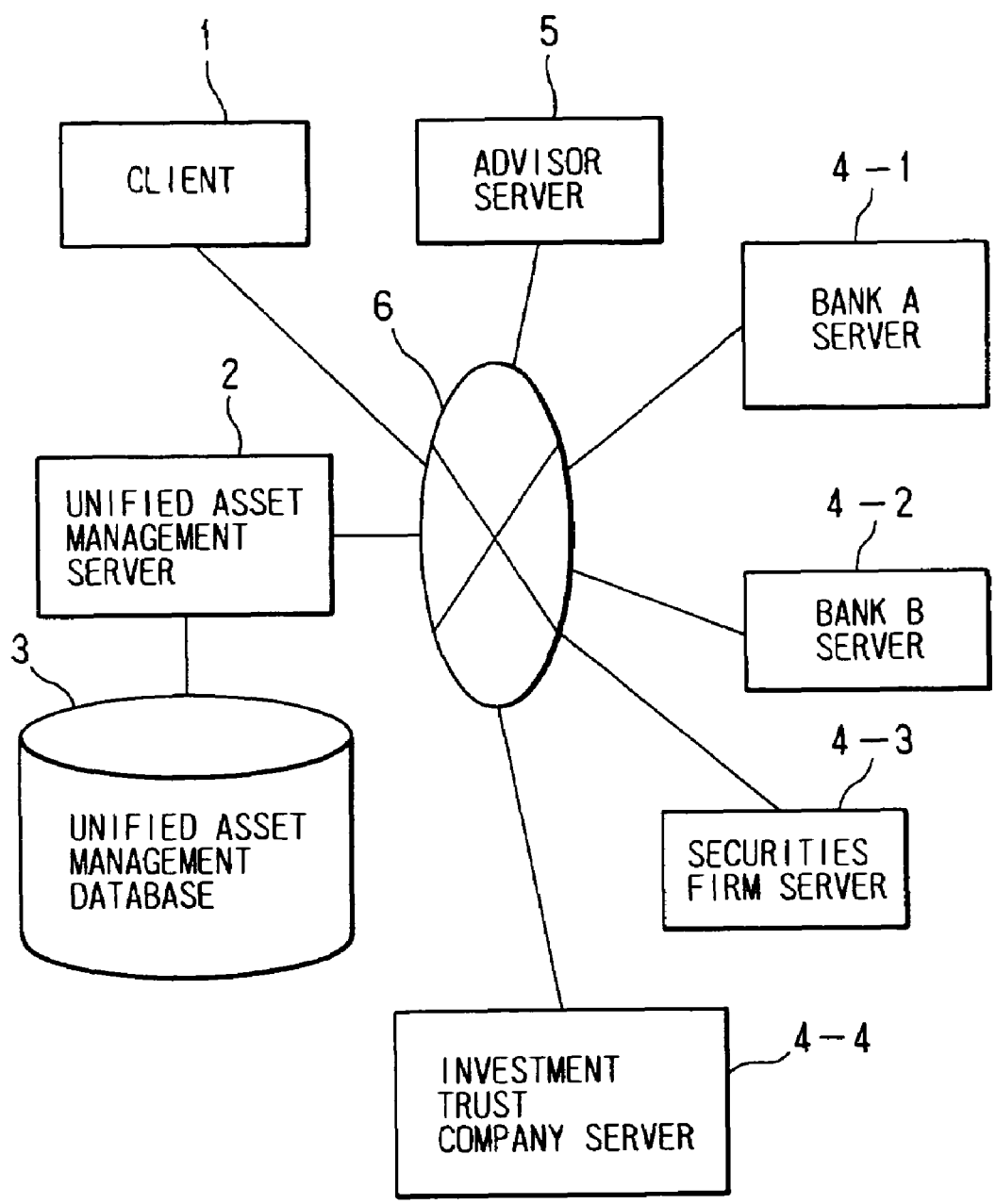
FIG. 2 is a diagram showing the overall constitution of a system of an aspect of the embodiment of the present invention.

FIG. 1 is a block diagram of a system of an aspect of the embodiment of the present invention. FIG. 2 is an illustration showing a utilization configuration of this system. As shown in FIG. 2, a unified asset management server 2 and a database 3 thereof related to an aspect of the embodiment of the present invention are connected to the Internet 6. The unified asset management server 2 receives a request from a client 1, and prepares and sends a portfolio thereof, and, in addition, sends this portfolio to an advisor server 5 as needed. The advisor server 5 analyzes the received portfolio, and sends an advice message to the client 1. The unified asset management server 2 accesses the servers 4-1 through 4-4 of banks, a securities firm, and an investment trust company at which the client 1 has accounts, and acquires the asset information of this client. By using the unified asset management server 2 in this manner, a user can collectively peruse on the Internet, and in real-time, the status of transactions and assets held by a plurality of different companies in accordance with manual/automatic updates. Perusal is possible via a home personal computer or an Internet mobile computing device by inputting beforehand the ID and password of each user of course, it is also possible to move from a perused page to the online trade home page (HP) of a securities firm with which the user has an account. Furthermore, by sending a portfolio to an advisor server 5, it is also possible to recieve advice by a financial planner (FP) based on comprehensive, up-to-date asset information.

Next, FIG. 1 will be explained. As explained hereinabove, the unified assets management server 2 performs data communications with the Bank A server 4-1, but for the sake of expediting the explanation, Internet and other displays are omitted in FIG. 1. The systems of other financial institutions are the same as FIG. 1. The left side of FIG. 1 shows the constitution of a unified asset management server, and the right side of the figure shows the constitution of the Bank A server 4-1.

The unified asset management server 2a of FIG. 1 prepares and sends a client's portfolio in accordance with a request from this client, and, in addition, manually/automatically receives this client's asset information from each financial institution's server. Data related to the received asset information is stored in a database 3b. The database 3b stores authentication information comprising an ID and password for accessing each financial institution's server. Authentication information is provided beforehand by a client 1. The unified asset management server 2a accesses the server of each financial institution based on the above-mentioned authentication information, and obtains the data of the asset information of this client. Based on the obtained data, the unified asset management server 2a prepares this client's portfolio. FIG. 3 and FIG. 4 show examples of portfolios. Because a portfolio of a client's total estate is displayed as in FIG. 4, a client can easily carry out his own asset management In the past, a client had to input this kind of portfolio into the computer himself while looking at notifications from financial institutions. However, thanks to the unified asset management server 2a manually/automatically obtaining asset information from each financial institution, portfolio preparation is no longer any trouble. Furthermore, the timing at which the unified asset management server 2a obtains this client's asset information from each financial institution is when there was a request from a client, and/or when a notification was received from a financial institution, and/or at a prescribed time specified by a clock/calendar apparatus 2b. Details will be given hereinbelow.

The Bank A server 4a of FIG. 2 is connected to an authentication database 4b, an asset management database 4c and a transaction management database 4d. The Bank A server 4a performs authentication based on the authentication database 4b, and, in addition, sends asset information and/or transaction information to an authenticated user. The Bank A server 4a carries out authentication based on authentication data, as well as information from a clock/calendar apparatus 4e. An event notification unit 4f sends a notification to the unified asset management server 2a each time there is a transaction when there is a request or contract from a client beforehand to the effect that such a notification is desired.

Next, operation will be explained. A user opens an account at a financial institution, and, in addition, acquires in advance an ID and password for Internet transactions. The ID and password are also sent to a unified asset management server. Furthermore, it is desirable that either a notification or a contract be concluded in advance to the effect that there will be requests to the financial institution from the unified asset management server beforehand for the sending of asset information.

There are a number of procedures by which a unified asset managements server 2a, obtains client as set information from a financial institution. These procedures will be explained in order hereinbelow.

(1) When there is a Request from a Client to a Unified Asset Management Server

This situation will be explained by referring to FIG. 5. When a user accesses a unified asset management server and attempts to obtain an up-to-date portfolio, firstly, a prior notification is sent out by the client to the Bank A server so that the latest asset information will be sent to the unified asset management server (S1). This is so asset information is not provided unnecessarily. There could also be a case in which a third party would attempt to obtain asset information without authorization, and there could also be a case in which the unified asset management server would attempt to obtain asset information on its own in violation of the contract with the user. By carrying out a prior notification, a user can control the disclosure of his asset information. The Bank A server makes a determination as to whether or not a request is from a real client based on an Internet protocol (IP) address and authentication information from a client. When there are a plurality of financial institutions, prior notifications are made to each (thereafter, the procedure is the same).

When there is a notification from the Bank A server acknowledging the prior notification (S2), the client requests the unified asset management server to update and display a portfolio (S3). Upon receiving this request, the unified asset management server requests authentication from the Bank A server (S4), and after authentication (S5), requests updated information related to assets (S6), and upon obtaining the required information (S7), requests termination (S8). Furthermore, the Bank A server can be constituted so as to provide authentication only when an authentication request is made (S4) within a prescribed time following prior notification (S1). Establishing a prior notification term of validity like this is desirable from the standpoint of security.

Once termination is confirmed (S9), the unified asset management server updates the portfolio (S10), and, in addition, sends an updated portfolio screen to the client (S11).

(2) When a Transaction is Generated by a Financial Institution

This situation will be explained by referring to FIG. 6. When an event, such as a funds transfer from a third party, or an automatic debit is performed for a client account at Bank A, a notification to this effect is sent to the event notification unit 4f of FIG. 1 (S20). The event notification unit 4f notifies the unified asset management server of the fact that an event has taken place (S21). The IP address and authentication information of the unified asset management server have been communicated to the Bank A server beforehand. Following acknowledgment by the unified asset management server (S22), the Bank A server communicates the update information (S23). After receiving a receipt notification from the unified asset management server (S24), the Bank A server executes a termination procedure (S25, S26).

Thereafter, the unified asset management server updates the portfolio (S27), and upon receiving a portfolio update display request from the client (528), sends the updated screen to the client (S29). Furthermore, when a portfolio is updated, the unified asset management server can be constituted so as to notify the client to the effect that updating has been performed.

According to the procedures of FIG. 6, it is possible to prepare a portfolio that reflects a transaction in real-time. Further, according to this procedure, the party is clearly identified for sending information from a financial institute to the unified asset management server, making it desirable from the aspect of security.

(3) When a Client Carries out a Transaction at a Financial Institution

This situation will be explained by referring to FIG. 7. A client requests Bank A to perform a transaction (S30 through S35). Thereafter, the client makes a request to the unified asset management server to update the portfolios since a transaction was carried out at Bank A (S36). Upon receiving this request, the unified asset management server requests authentication from the Bank A server (S37), and after authentication (S38), requests updated information related to assets (S39), and upon obtaining the required information (S40), requests termination (S41). Furthermore, the Bank A server can be constituted so as to provide authentication only when an authentication request is made (S37) within a prescribed time following transaction generation notification (S36). Establishing a prior notification term of validity like this is desirable from the standpoint of security.

Once termination is confirmed (S42), the unified asset management server updates the portfolio (S43), and, in addition, in accordance to a request (S44), sends an updated portfolio screen to the client (S45).

(4) At a Predetermined Time, Such as the Beginning or End of a Term

This situation will be explained by referring to FIG. 8. The unified asset management server is automatically started up by a timer (S50), and sends a request for authentication to the Bank A server (S51). The Bank A server performs this authentication within a period determined in advance with the user, for example, at the beginning or end of a term, or the end of the month (S53). The Bank A server will not perform authentication when a request is not within the period determined beforehand. Because the unified asset ID management server performs the procedures of FIG. 8 automatically without instructions from a client, strict authentication is desirable.

Following authentication (S53), the unified asset management server requests updated information related to assets (S54), and upon obtaining the required information (S55), requests termination (S56).

When termination has been confirmed (S57), the unified asset management server updates the portfolio (S58), notifies the client of the update, and, in addition, sends the portfolio to an advisor as needed (S60a). This is to receive an advisor's advice when the portfolio is updated at the beginning or end of a term. The unified asset management server, in accordance with a request from the client (S61), sends the client an updated portfolio screen (S62). Furthermore, the procedures can be constituted such that the client notifies an advisor manually (S60b).

As explained hereinabove, according to a system/method of an aspect of the embodiment of the present invention, a user can peruse on the Internet and in real-time via automatic updating the status of transactions and assets held in a plurality of different companies.

The present invention is extremely convenient, enabling each user, by inputting an ID and a password, to peruse his portfolio using a home personal computer or an Internet-enabled mobile computing device. Further, it also makes it possible to move from a perused page to the online trading HP of a securities firm or the like with which a user has an account.

The present invention, also makes it possible to use an up-to-date portfolio to receive advice from a financial planner (FP) based on comprehensive, up-to-the-minute asset information.

The aspects of the embodiment of the present invention make it possible to provide heretofore-nonexistent services, whereby assets held by a plurality of different companies can be collectively perused. In particular, according to the aspects of the embodiment of the present invention, security is also high since in addition to ID and password authentication, authentication is also performed on the basis of whether or not there has been a user request, and/or, using a signal from a clock/calendar apparatus, whether or not a request for the sending of asset information was made at the proper time.

The unified asset management server can be positioned as a portal site for so-called personal asset management, and is expected to attract numerous users. An individual can constantly have an up-to-date portfolio provided automatically by simply registering his financial institutions in the unified asset management server. Unified asset management server-based services can be received either free of charge or at a reasonable cost. This is because the unified asset management server is positioned as a portal site. For example, even if portfolio preparation costs are not obtained from users, server operating costs can be obtained by displaying banner advertisements on the portal site, and introduction fees can be obtained by introducing users to appropriate financial institutions in accordance with requests. This is made possible due to the fact that a unified asset management server can be constituted as a portal site for personal asset management through the preparation of personal portfolios.

The present invention is not limited to the above-mentioned aspects of the embodiment, and is capable of various modifications within the scope of the inventions disclosed in the claims. Naturally, these variations will also fall within the scope of the present invention.

Further, in this specification, means does not always signify physical means, but rather also includes cases in which the function of each means is achieved via software. Furthermore, the function of one means can be achieved by two or more physical means, or the functions of two or more means can be achieved by one physical means.

What is claimed is:

1. A method for the unified management of a plurality of assets allowing collective perusal of the real-time status of transactions and assets held by a user at a plurality of different companies by using a computer network and a unified asset management server, comprising the steps of:

a client computer sending a prior notification which requests a financial institution server to send asset information to a unified asset management server;

said financial institution server making a determination as to whether or not said prior notification is from said client computer;

said financial institution server returning an acknowledgement for said prior notification to said client computer when said prior notification is from said client computer;

said client computer making a request to said unified asset management server to update a portfolio after said client computer receives said acknowledgement;

said unified asset management server making a request to said financial institution server to perform authentication;

said financial institution server providing authentication when said unified asset management server is the server specified in said prior notification from said client computer;

said unified asset management server making a request to said financial institution server to send said asset information;

said financial institution server sending said asset information to said unified asset management server;

said unified asset management server updating a portfolio based on said asset information received; and said unified asset management server sending an updated portfolio to said client computer.

2. The method for the unified management of a plurality of assets using a computer network according to claim 1, further comprising the step of sending said updated portfolio to an adviser server in order to receive advice.

* * * * *